2 Sheets—Sheet 1.

J. H. PETERSON.

MECHANICAL MOVEMENT.

No. 11,487. Reissued Apr. 16, 1895.

Witnesses:
Charles F. Wilcox,
R. H. Orwig.

Inventor: Jacob H. Peterson,
By Thomas G. Orwig, Attorney.

THE NORRIS PETERS CO., PHOTO-LITHO., WASHINGTON, D. C.

2 Sheets—Sheet 2.
J. H. PETERSON.
MECHANICAL MOVEMENT.
No. 11,487. Reissued Apr. 16, 1895.
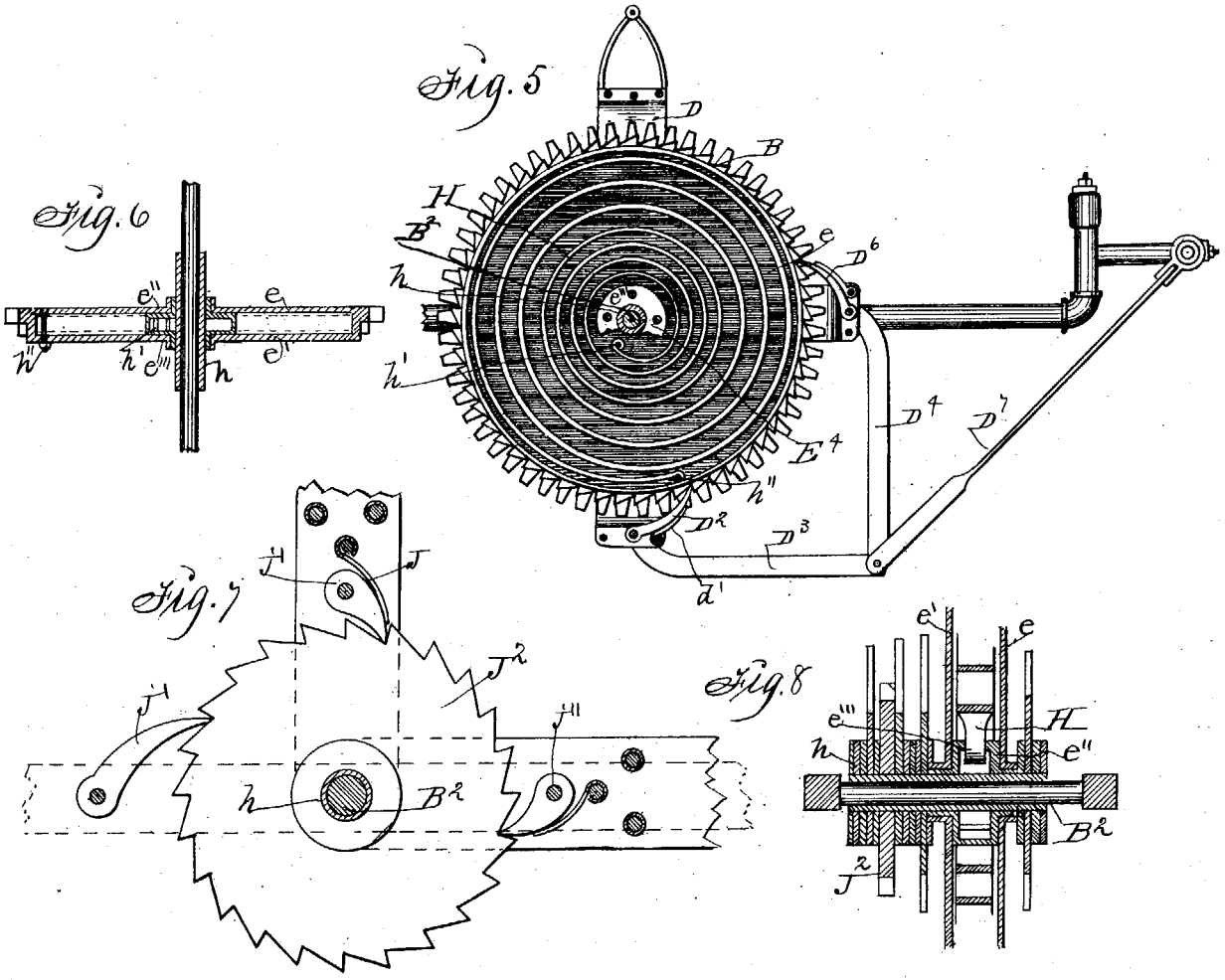
Witnesses:
Charles H. Wilcox
R. H. Orwig
Inventor: Jacob H. Peterson,
By Thomas G. Orwig, Attorney.
THE NORRIS PETERS CO., PHOTO-LITHO., WASHINGTON, D. C.

UNITED STATES PATENT OFFICE.

JACOB H. PETERSON, OF DES MOINES, IOWA.

MECHANICAL MOVEMENT.

SPECIFICATION forming part of Reissued Letters Patent No. 11,487, dated April 16, 1895.

Original No. 453,207, dated June 2, 1891. Application for reissue filed June 13, 1893. Serial No. 477,510.

*To all whom it may concern:*

Be it known that I, JACOB H. PETERSON, a citizen of the United States, residing at Des Moines, in the county of Polk and State of Iowa, have invented a new and useful Mechanical Movement, of which the following is a specification.

My invention relates to that class of mechanical movements especially designed for propelling vehicles, and it has for its object the provision of means by which an energy of comparatively small intensity at the point of application may be made to reappear as an energy of comparatively considerable intensity at the point of application, in combination with means by which potential energy may be stored and utilized while the machine is at motion or at rest.

My invention consists, structurally, in a central drive shaft within a suitable frame having double toothed perimeters one of which meshes with the wheel mounted on a shaft, from which the movement of rotation may be communicated to the running gear of the vehicle, and the other engaged by pawls secured to the pivoted linking connections of a hand lever, so that the central drive wheel may be rotated in one common direction in the reciprocation of the lever to actuate the drive shaft as required to advantageously propel a vehicle therewith.

My invention consists further in the combination with pawls and ratchets and particular constructions and arrangements of parts by which a spring coiled about the central shaft may be wound while the machine is at rest or in motion and its potential energy stored to assist in actuating the vehicle.

My invention consists further in pivoted pawls and ratchet wheels which wind the spring fixed to the central drive-shaft during the operation of the machine.

My invention consists further in certain details of construction hereinafter more fully described, reference being had to the accompanying drawings, in which—

Figure 1:
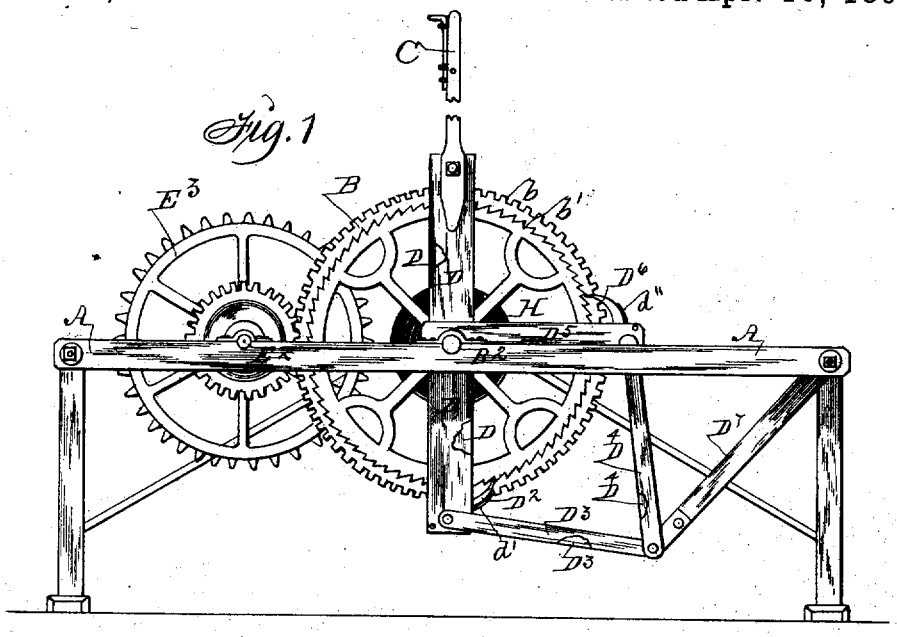
Figure 2:
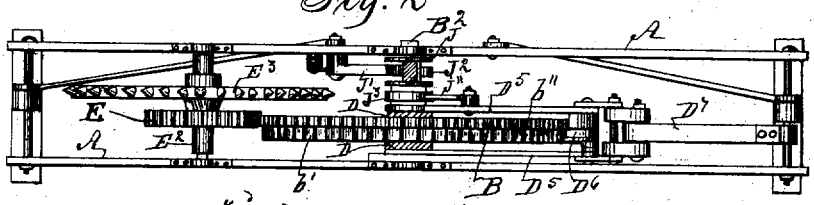
Figure 3:
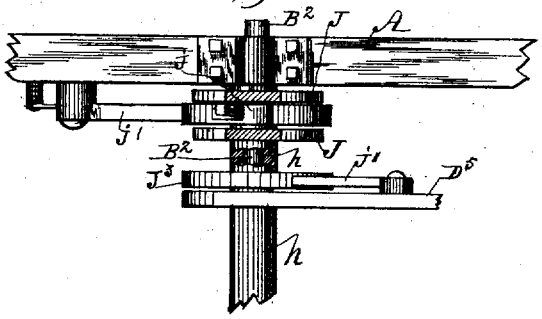
Figure 4:
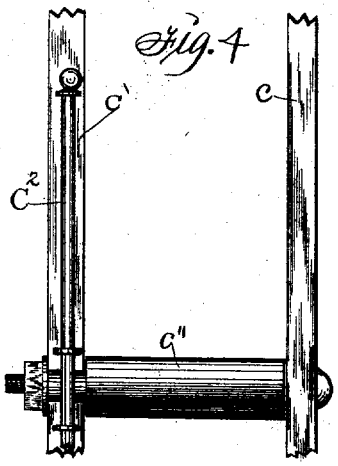

Figure 1 is a side view of my improved mechanism. Fig. 2 is a top plan view of the same. Figs. 3 and 4 are detail views illustrating the separable lever, spring, and spring winding device. Fig. 5 is a side elevation of the central drive wheel, one of the webs thereof being removed to show the spring. Fig. 6 is a sectional view of the central drive-wheel. Fig. 7 is a detail enlarged view showing the pawl and ratchet for winding the spring. Fig. 8 is an enlarged detail cross-sectional elevation through the center of the drive wheel.

A represents a supporting or carrying frame which may be of such a form as to adapt it for use in conjunction with the particular form of vehicle to which it may be desired to apply the mechanism.

B represents a central drive wheel mounted upon the drive shaft $B^2$, said wheel having a double perimeter $b$ $b'$.

C is a hand-actuated lever consisting of two parts $c$ $c'$, connected near their top portions by means of a cross-piece $c''$, Fig. 4.

The central drive-wheel B, as shown in Figs. 5, 6, and 8, is made up of two webs $e$ and $e'$, one of which $e$ is formed with the toothed perimeters $b$ $b'$, and the one $e'$ adapted to be adjusted and bolted to the web $e$ after the spring H is adjusted and secured in place as about to be described. Formed in two parts, $e''$ and $e'''$, is a central hub-wheel $E^4$ keyed to the collar $h$, which said parts are bolted together, one end of the convolute spring H being first secured to the pin $h'$. Both of the webs, $e$ and $e'$, being perforated at their centers, the web $e$ is first slipped over and upon the shaft B and adjusted in position upon the flanges of the central hub $E^4$ as shown more clearly in Fig. 8. The spring H is then disposed within the interior periphery of the perimeters, $b$ and $b'$, as shown in Fig. 5, its remaining outer end being secured to the pin $h''$, after which the remaining web $e'$ is adjusted in place and bolted to web $e$ thus forming the completed wheel B, with the spring disposed within its interior, the said wheel B being mounted upon the shaft $B^2$, fixed in the frame and free to rotate independently about the same and independently also of the collar $h$, except that in the case of the latter the central hub $E^4$, being keyed to the collar $h$, mounted on the shaft $B^2$, is connected by the spring H, to or near the periphery of the wheel B, said wheel, however, revolving entirely independently of the stationary shaft $B^2$.

Referring to Fig. 7, the means of winding the spring is more clearly shown, in this instance but one ratchet-wheel $J^2$ being employed, secured to the collar $h$, which is the preferred form.

Pivoted between the two pieces D at their lower ends is a pawl $D^2$, which is kept in engagement with the ratchet-teeth of the perimeter of the rim $b'$ by the spring $d'$.

$D^3$ is a horizontal connecting-link pivotally connected to the lower end portions of the connecting pieces D at one end and at the other pivotally connected to the vertical connecting-piece $D^4$, the upper end of which latter is pivotally connected to the ends of horizontal connecting pieces $D^5$ the other ends of which latter are pivotally mounted about the axis $B^2$ of the central drive wheel B. Between the connecting pieces $D^5$ is pivoted a pawl $D^6$, held in engagement with the perimeter $b'$ of wheel B by means of spring $d''$.

$D^7$ is an arm pivoted at one end to the point of junction between the horizontal connecting-link $D^3$ and the vertical connecting-link $D^4$ and at its other end pivoted within the end of the frame A.

The perimeter $b$ of the central-drive wheel B is formed with teeth, which mesh with those of a pinion E mounted fixedly on the shaft $E^2$, which latter finds its bearings within the frame A. The pinion E is fixed to a sprocket-wheel $E^3$, also fixedly mounted on the shaft $E^2$. It is evident, however, that the wheel $E^3$, being the last in the train of mechanism, may be of a character suitable for the performance of the given work.

H is a convolute spring, which is disposed about and has one of its ends secured to a collar or a sleeve $h$, loosely mounted in the frame and adapted to be rotated in the manner to be described. Through the central drive-wheel shaft $B^2$ passes the other end of the spring, being secured to the wheel B by means of a pin, (not shown) the spring H in turn being secured to the pin, the lever C being made up of two parts, one of which $c'$ is adapted to be separated from the other $c$ by a latch $C^2$, holding said part $c'$ to the cross-piece $c''$. The separable part $c'$ has secured to its lower end check-plates J, which are mounted on collar $h$ and hold pivoted between them a spring-pawl $j$, which engages the teeth of the ratchet-wheel $J^2$, fixed to said collar $h$. $j'$ is a spring-dog, also engaging the teeth of the ratchet $J^2$. $J^3$ is a ratchet-wheel, also fixed to the collar $h$, engaged by the spring-pawl $j''$, which latter is pivoted on the connecting-piece $D^5$.

The operation of my device is as follows: The operator actuates the lever C through the medium of the connecting-pieces D, the horizontal connecting link $D^3$, vertical connecting link $D^4$, and horizontal connecting pieces $D^5$, the pawl $D^6$, engaging the perimeter $b'$ of and rotating the central drive wheel in the one movement of the lever C and the pawl $D^2$ engaging the perimeter $d'$ of and rotating the said wheel in the same direction on the movement of the said lever in the opposite direction. By this means a practically continuous rotation of the central drive-wheel B is obtained, which is transmitted to the sprocket-wheel $E^3$.

In the actuation of the lever C the pawl $j$, pivoted between the check-plates J, engages the ratchet-wheel $J^2$, fixed to the collar $h$, which latter in turn rotates the central hub $E^4$, winding the spring H, this being accomplished in the backward movement of the lever C, which lever in its forward movement causes the pawl $J^2$ to engage and actuate its ratchet wheel $J^2$, the dog $j'$ serving to keep the spring H from unwinding.

If it be desired to wind the spring H when the machine is at rest, the operator may operate the lever C by unlatching and disconnecting the part $c'$, and said part through the medium of its pawl J, acting on ratchet-wheel $J^2$, may then be employed to wind the spring.

It is obvious that the parts designated as pieces D are really parts of the lever C and that the vibration thereof actuates the parts $D^3$, $D^4$, $D^5$, and $D^7$ as required to bring the pawls $D^2$ and $D^6$ alternately into engagement with the wheel B to produce a forward motion of said wheel and thereby a continuous rotary motion of the drive shaft $B^2$, and that consequently the drive shaft can be operated to propel the vehicle when the spring H is dormant. The parts D and $D^3$ pivotally connected serve as a toggle jointed lever to apply force to the drive wheel by means of the pawl $D^2$ and the parts $D^4$ and $D^5$ serve as a toggle-jointed lever to apply force to the drive wheel by means of the pawl $D^6$, and the arm $D^7$ in combination with the parts $D^3$ serves as a toggle-jointed lever in applying force to the wheel B through the medium of the pawl $D^2$, and the same arm $D^7$ in combination with the parts $D^4$ serves as a toggle-jointed lever in applying force to the same wheel B through the pawl $D^6$. A compound leverage is thus produced to augment the manual force applied to the lever C and to convert the vibratory motion of said lever into a continuous rotary motion.

Having thus described my invention, what I claim as new therein, and desire to secure by Letters Patent, is—

1. The combination, in a mechanical movement, of a central drive-wheel, a spring arranged about a sleeve, the latter having a ratchet or plurality of ratchet-wheels fixed thereto, said spring being secured to the central drive-wheel to actuate the same, and pawls engaging the ratchet-wheels, said pawls being actuated to wield the spring in both movements of the actuating-lever, as and for the purposes set forth.

2. In a mechanical movement, a separable actuating-lever formed of two parts, a central drive wheel, a plurality of pawls engaging the drive-wheel, connecting-links carrying said pawls actuated by one of the parts of said levers, a spring secured at one end to the central drive-wheel, a sleeve to which the other end of the spring is fixed, a ratchet wheel carried by said sleeve, and a pawl or pawls engaging said ratchet-wheel, actuated by the other part of the lever to wind the spring when the machine is either in motion or at rest, as set forth.

3. In a mechanical movement, a central drive-wheel having double toothed perimeters, a plurality of connecting links operated by a lever, a plurality of pawls engaging the perimeters of the central drive-wheels, operated by the lever, a convolute spring disposed within the central drive-wheel and having one of its ends fastened thereto, a rotatable sleeve mounted upon a stationary axis secured in the frame to which the remaining end of the spring is fixed, a ratchet wheel or wheels fixed upon said sleeve, and a pawl or pawls actuated by the lever, engaging said ratchet wheel or wheels, as set forth.

4. A mechanical movement comprising a rotatable shaft, a drive wheel placed loosely on said shaft and provided with an external ratchet at its circumference, and a lever of the first order pivoted to the shaft to extend across the side of said wheel, a bar or link pivoted to the lower end and short arm of said lever to produce a toggle jointed lever, a pawl pivoted in the joint thus produced to engage the ratchet at the circumference of the wheel, a toggle jointed lever composed of two parts and one end thereof pivoted to the shaft and the other end pivoted to the toggle jointed lever that is connected with the lower end of the hand lever, a pawl pivoted in the joint of this second toggle jointed lever to engage the external ratchet at the circumference of the wheel, and an arm pivoted at one end of the frame that supports the shaft and at its other end to the two toggle jointed levers, all arranged and combined to operate in the manner set forth for the purposes stated.

5. In a mechanical movement, the combination of the wheel B, having an external ratchet at its circumference the shaft $B^2$, the hand lever C, and pieces D the pawl $D^2$, the links or parts of toggle jointed levers $D^3$, $D^4$ and $D^5$, the pawl $D^6$, and the arm $D^7$, to operate in the manner set forth for the purposes stated.

JACOB H. PETERSON.

Witnesses:
CHARLES F. WILCOX,
THOMAS G. ORWIG.